(12) United States Patent
Lee

(10) Patent No.: US 11,415,850 B2
(45) Date of Patent: Aug. 16, 2022

(54) DISPLAY DEVICE

(71) Applicant: Samsung Display Co., Ltd., Yongin-Si (KR)

(72) Inventor: Yong Hee Lee, Suwon-si (KR)

(73) Assignee: Samsung Display Co., Ltd.

( * ) Notice: Subject to any disclaimer, the term of this patent is extended or adjusted under 35 U.S.C. 154(b) by 141 days.

(21) Appl. No.: 17/027,636

(22) Filed: Sep. 21, 2020

(65) Prior Publication Data

US 2021/0294169 A1  Sep. 23, 2021

(30) Foreign Application Priority Data

Mar. 18, 2020  (KR) .................. 10-2020-0033180

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................................................. G02F 1/13628
See application file for complete search history.

(56) References Cited

U.S. PATENT DOCUMENTS

| 8,045,113 | B2 | 10/2011 | Chen et al. | |
| 2010/0085525 | A1* | 4/2010 | Chen .................. | G02F 1/133707 |
| | | | | 257/E29.273 |
| 2020/0103688 | A1* | 4/2020 | Lee ........................ | G02F 1/1362 |
| 2020/0285089 | A1* | 9/2020 | Lee .................... | G02F 1/133514 |

FOREIGN PATENT DOCUMENTS

| KR | 2016-0119900 A | 10/2016 |
| KR | 10-1675372 B1 | 11/2016 |
| KR | 2017-0030134 A | 3/2017 |
| KR | 2017-0062562 A | 6/2017 |

\* cited by examiner

*Primary Examiner* — Sang V Nguyen
(74) *Attorney, Agent, or Firm* — Innovation Counsel LLP

(57) ABSTRACT

A display device includes the following elements: a scan line lengthwise in a first direction; two data lines each lengthwise in a second direction; a transistor including a first electrode, a second electrode, and a gate electrode; and a sub-pixel electrode including a first stem, a second stem, a connector, a first protrusion, and a second protrusion. The first electrode is connected to one of the two data lines. The gate electrode is connected to the scan line. The first stem is lengthwise in the first direction and is connected through the second stem and the connector to the second electrode. The second stem is lengthwise in the second direction. The connector overlaps the second electrode. The first protrusion and the second protrusion respectively protrude from two sides of the connector, respectively overlap the two data lines, and are lengthwise in the first direction.

20 Claims, 11 Drawing Sheets

FIG. 7
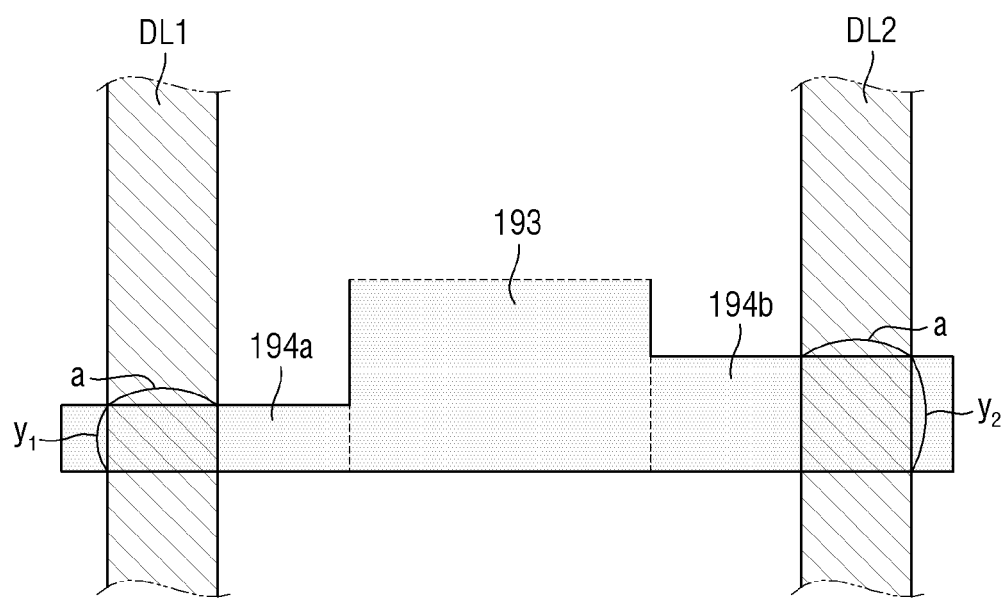
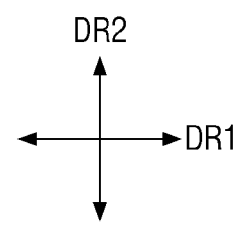

DISPLAY DEVICE

CROSS-REFERENCE TO RELATED APPLICATION

This application claims priority to Korean Patent Application No. 10-2020-0033180 filed on Mar. 18, 2020 in the Korean Intellectual Property Office; the Korean Patent application is incorporated by reference.

BACKGROUND

1. Technical Field

The technical field relates to a display device.

2. Description of the Related Art

A liquid crystal display device may include field-generating electrodes (such as pixel electrodes and a common electrode) and a liquid crystal layer. The liquid crystal display device may form an electric field in the liquid crystal layer by applying a voltage to the field-generating electrodes, so as to determine orientations of liquid crystal molecules in the liquid crystal layer, for controlling transmission of light transmitted through the liquid crystal layer to display an image.

SUMMARY

Embodiments may be related to a display device with minimum unwanted variation in parasitic capacitance between a sub-pixel electrode and data lines.

According to an embodiment, a display device comprises a display panel including a sub-pixel; a gate driver connected to the sub-pixel through a scan line extending in a first direction; and a data driver connected to the sub-pixel through a data line extending in a second direction crossing the first direction, wherein the display panel includes a sub-pixel electrode disposed in the sub-pixel, wherein the data line includes a first data line and a second data line respectively disposed to overlap the sub-pixel electrode, wherein the display panel includes a first transistor disposed in the sub-pixel, the first transistor having one electrode connected to the first data line, the other electrode connected to the sub-pixel electrode, and a gate electrode connected to the scan line, wherein the sub-pixel electrode includes a first pixel electrode portion and a second pixel electrode portion connected to the first pixel electrode portion, wherein the first pixel electrode portion includes a stem electrode having a horizontal stem electrode extending along the first direction and a vertical stem electrode extending along the second direction to divide the first pixel electrode portion into a plurality of domains, and a fine branch portion having a plurality of branch electrodes extending from at least one side of the stem electrode, wherein the second pixel electrode portion protrudes from one side of the first pixel electrode portion, is disposed to overlap the other electrode of the first transistor in a thickness direction, and is electrically connected to the other electrode of the first transistor, wherein the sub-pixel electrode includes a first compensation portion protruding from the second pixel electrode portion to one side in the first direction, and a second compensation portion protruding from the second pixel electrode portion to the other side in the first direction, wherein the first compensation portion is disposed to overlap the first data line, and wherein the second compensation portion is disposed to overlap the second data line.

The one side in the first direction is an opposite direction of the other side in the first direction.

The first pixel electrode portion includes an edge electrode surrounding a second side, a third side, and a fourth side of the first pixel electrode portion except for a first side of the first pixel electrode portion connected to the second pixel electrode portion in a plan view of the display device.

The first pixel electrode portion is divided into four domains by the stem electrode, and the four divided domains include a first domain, a second domain adjacent to the first domain in the second direction, a third domain adjacent to the first domain in the first direction, and a fourth domain adjacent to the third domain in the second direction.

The fine branch portion having the plurality of branch electrodes and slit patterns formed between the adjacent branch electrodes are disposed in each of the four domains.

The first data line is disposed to overlap the first domain and the second domain, and the second data line is disposed to overlap the third domain and the fourth domain.

An overlapping area between the first data line and the first and second domains is different from an overlapping area between the second data line and the third and fourth domains.

The fine branch portion and the slit patterns of the first domain are alternately arranged with the fine branch portion and the slit patterns of the third domain, respectively.

An overlapping area between the first data line and the first and second domains is greater than an overlapping area between the second data line and the third and fourth domains.

The data line and the sub-pixel electrode are configured to form a first data pixel capacitor, and A data pixel capacitance of the first data pixel capacitor caused by overlapping between the first data line and the first and second domains is greater than a data pixel capacitance of the first data pixel capacitor caused by overlapping between the second data line and the third and fourth domains.

An overlapping area between the second compensation portion and the second data line is greater than an overlapping area between the first compensation portion and the first data line.

The data line and the compensation portion are configured to form a second data pixel capacitor, and A data pixel capacitance of the second data pixel capacitor caused by overlapping between the second data line and the second compensation portion is greater than a data pixel capacitance of the second data pixel capacitor caused by overlapping between the first data line and the first compensation portion.

The second pixel electrode portion is formed integrally by extending from the second domain and the fourth domain, respectively.

The second pixel electrode portion extends from the second domain.

A separation distance between the second pixel electrode portion and the first data line is smaller than a separation distance between the second pixel electrode portion and the second data line.

Sub-pixels are arranged in a matrix along the first direction and the second direction.

The display panel includes a plurality of gate pads connected to the gate driver, A scan line connected to the sub-pixels in a first row arranged in the first direction, and a scan line connected to the sub-pixels in a second row arranged in the first direction, the second row being adjacent to the first row in the second direction, are respectively connected to the same gate pad.

One of the sub-pixels adjacent in the second direction is connected to the first data line, and the other one is connected to the second data line.

According to an embodiment, a display device comprises a sub-pixel; a scan line connected to the sub-pixel and extending along a first direction; a data line connected to the sub-pixel and extending in a second direction crossing the first direction; and a sub-pixel electrode disposed in the sub-pixel, wherein the data line includes a first data line and a second data line respectively disposed to overlap the sub-pixel electrode, wherein a first transistor disposed in the sub-pixel includes one electrode connected to the data line, the other electrode connected to the sub-pixel electrode, and a gate electrode connected to the scan line, wherein the sub-pixel electrode includes a first pixel electrode portion and a second pixel electrode portion connected to the first pixel electrode portion, wherein the first pixel electrode portion includes a stem electrode having a horizontal stem electrode extending along the first direction and a vertical stem electrode extending along the second direction to divide the first pixel electrode portion into a plurality of domains, and a fine branch portion having a plurality of branch electrodes extending from at least one side of the stem electrode, wherein the second pixel electrode portion protrudes from one side of the first pixel electrode portion, is disposed to overlap the other electrode of the first transistor in a thickness direction, and is electrically connected to the other electrode of the first transistor, wherein the sub-pixel electrode includes a first compensation portion protruding from the second pixel electrode portion to one side in the first direction, and a second compensation portion protruding from the second pixel electrode portion to the other side in the first direction, wherein the first compensation portion is disposed to overlap the first data line, and wherein the second compensation portion is disposed to overlap the second data line.

An overlapping area between the second compensation portion and the second data line is greater than an overlapping area between the first compensation portion and the first data line.

An embodiment may be related to a display device. The display device may include the following elements: a first scan line extending lengthwise in a first direction; a first data line extending lengthwise in a second direction and crossing the first scan line; a second data line extending lengthwise in the second direction and crossing the first scan line; a first transistor including a first electrode, a second electrode, and a gate electrode; and a sub-pixel electrode including a first stem electrode, a second stem electrode, a connecting member, a first protrusion, and a second protrusion. The first electrode of the first transistor may be electrically connected to the second data line. The gate electrode of the first transistor may be electrically connected to the first scan line. The first stem electrode may extend lengthwise in the first direction and may be electrically connected through the second stem electrode and the connecting member to the second electrode of the first transistor. The second stem electrode may extend lengthwise in the second direction. The connecting member may overlap the second electrode of the first transistor. The first protrusion may protrude from a first side of the connecting member, may extend lengthwise in the first direction, and may overlap the first data line. The second protrusion may protrude from a second side of the connecting member, may extend lengthwise in the first direction, and may overlap the second data line.

The first side of the connecting member may be opposite the second side of the connecting member in the first direction. At least one of the first side of the connecting member and the second side of the connecting member may overlap the second electrode of the first transistor.

The sub-pixel electrode may include an edge electrode directly connected to at least one end of the first stem electrode and directly connected to at most one end of the second stem electrode.

The sup-pixel electrode may include branch electrodes that are directly connected to at least one of the first stem electrode, the second stem electrode, and the edge electrode. The branch electrodes may be divided into four domains by the first stem electrode and the second stem electrode. The four domains may include a first domain, a second domain adjacent to the first domain in the second direction, a third domain adjacent to the first domain in the first direction, and a fourth domain adjacent to the third domain in the second direction.

The sub-pixel electrode may include slits between adjacent branch electrodes in each of the four domains.

The first data line may overlap the first domain and the second domain. The second data line may overlap the third domain and the fourth domain.

A maximum overlap between the first data line and branch electrodes of the first and second domains may be greater than or less than a maximum overlap between the second data line and branch electrodes of the third and fourth domains.

Branch electrodes of the first domain may be alternately arranged with branch electrodes of the third domain.

The maximum overlap between the first data line and the branch electrodes of the first and second domains may be greater than the maximum overlap between the second data line and the branch electrodes of the third and fourth domains.

A capacitance caused by the maximum overlap between the first data line and the branch electrodes of the first and second domains may be greater than a capacitance caused by the maximum overlap between the second data line and the branch electrodes of the third and fourth domains.

A maximum overlap between the second protrusion and the second data line may be greater than a maximum overlap between the first protrusion and the first data line.

A capacitance caused by the maximum overlap between the second protrusion and the second data line may be greater than a capacitance caused by the maximum overlap between the first protrusion and the first data line.

The connecting member may be electrically connected through at least one of a branch electrode of the second domain and a branch electrode of the fourth domain to the second stem electrode.

The connecting member may be electrically connected through a branch electrode of the second domain to the second stem electrode and may be formed of a material of the branch electrode of the second domain.

The connecting member may be positioned closer to the first data line than to the second data line.

The display device may include the following elements: first-row sub-pixel electrodes aligned with the sub-pixel electrode in the first direction; and first-column sub-pixel electrodes aligned with the sub-pixel electrode in the second direction.

The display device may include the following elements: a second scan line neighboring the first scan line with no intervening scan line being positioned between the first scan line and the second scan line; second transistors; second-row sub-pixel electrodes electrically connected to the second scan line; and a gate pad directly connected to each of the first scan line and the second scan line.

The display device may include a second transistor. One of the first-column sub-pixel electrodes may be immediately adjacent to the sub-pixel electrode with no intervening sub-pixel electrode and may be electrically connected through the second transistor to the first data line.

The second protrusion may be wider than the first protrusion in the second direction.

A maximum overlap between the second protrusion and the second data line may be greater than a maximum overlap between the first protrusion and the first data line.

BRIEF DESCRIPTION OF THE DRAWINGS

FIG. 7 is diagram for comparing an overlapping area of a first data line and a first compensation portion with an overlapping area of a second data line and a second compensation portion according to one embodiment.

DETAILED DESCRIPTION OF EMBODIMENTS

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

The term "portion" may mean "section" or "member." The term "connect" may mean "electrically connect." The term "insulate" may mean "electrically insulate" or "electrically isolate." The term "conductive" may mean "electrically conductive." The term "pattern" may mean "structure." The term "shape" may mean "structure." The term "overlapping area" may mean "maximum overlap." The term "different" may mean "unequal." The expression that an object is lengthwise in a recited direction may mean that the lengthwise direction of the object is (in) the recited direction.

Figure 1:
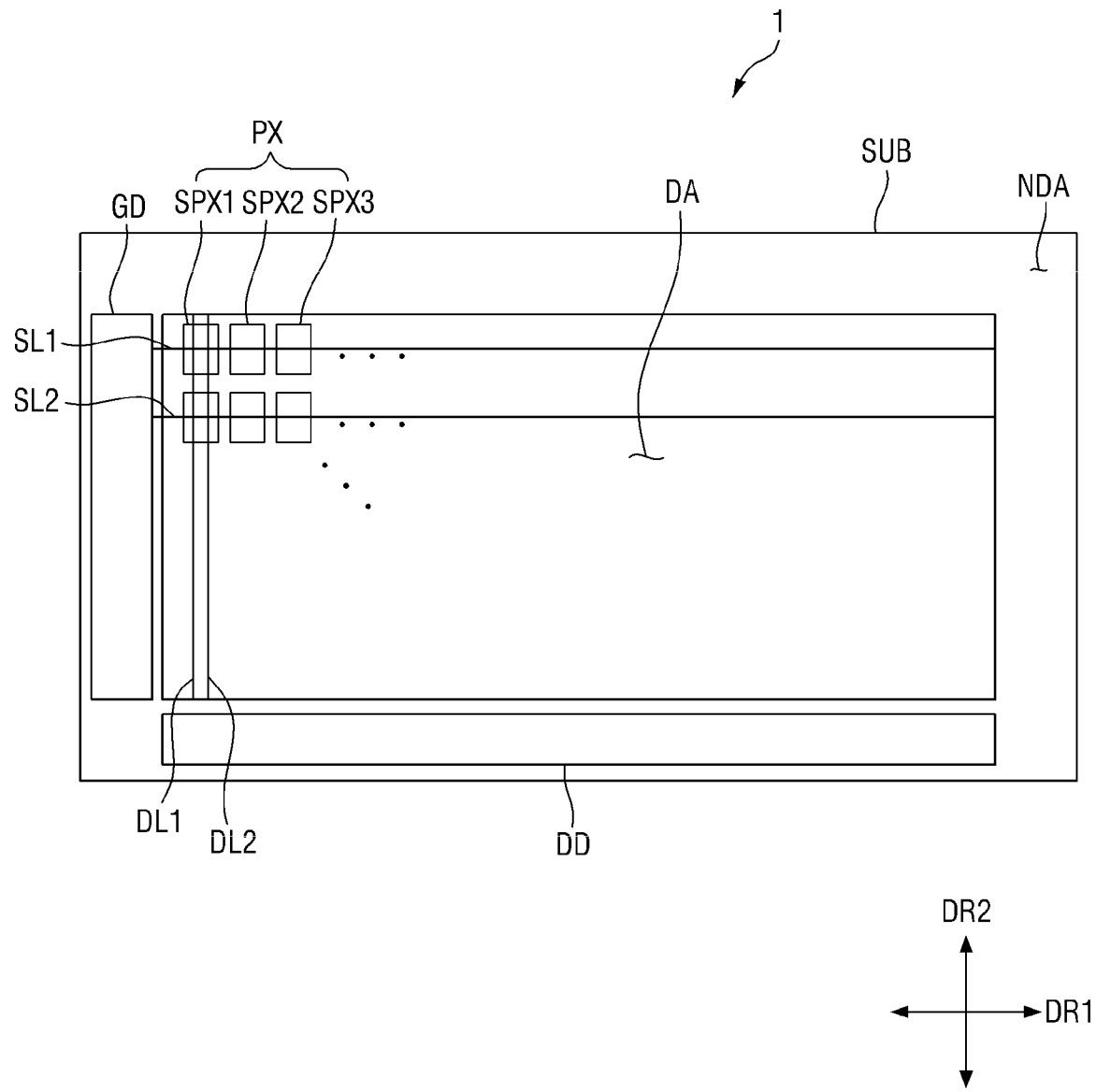
FIG. 1 is a plan view of a display device according to one embodiment.

FIG. 1 is a plan view of a display device according to one embodiment.

Referring to FIG. 1, the display device 1 may include a display area DA and a non-display area NDA disposed around the display area DA. The display area DA may be surrounded by the non-display area NDA. The display area DA may display an image according to signals received by the display device 1. The non-display area NDA may not be affected by input signals. A gate driver GD and a data driver DD may be disposed in the non-display area NDA. The display device 1 may include a substrate SUB. The display area DA and the non-display area NDA of the substrate SUB may correspond to the display area DA and the non-display area NDA of the display device 1.

A plurality of pixels PX may be positioned in the display area DA. The pixels PX may be arrayed in a matrix fashion along a first direction DR1 and a second direction DR2 different from the first direction DR1. The first direction DR1 and the second direction DR2 may be orthogonal to each other. In a plan view, the display device 1 may have at least one of a rectangular shape, a square shape, a circular shape, an oval shape, and a polygonal shape. The first direction DR1 may correspond to a long side of the display device 1, and the second direction DR2 may correspond to a short side of the display device 1.

Each pixel PX may include sub-pixels SPX1, SPX2, and SPX3. For example, the sub-pixels SPX1, SPX2, and SPX3 may be a red pixel, a green pixel, and a blue pixel, respectively. In some embodiments, each pixel PX may further include a white pixel in addition to the red pixel, green pixel, and blue pixel.

Pixels PX arrayed along the first direction DR1 may form pixel rows. The pixel rows may be arrayed along the second direction DR2. The pixel rows may include a first pixel row and a second pixel row immediately adjacent to the first pixel row in the second direction DR2. Pixels PX arrayed along the second direction DR2 may form pixel columns. The pixel columns may be arrayed along the first direction DR1. Each pixel column may include a plurality of sub-pixel columns. One pixel column may include a first sub-pixel column (which includes first sub-pixels SPX1 arranged along the second direction DR2), a second sub-pixel column (which includes second sub-pixels SPX2 arranged along the second direction DR2), and a third sub-pixel column (which includes third sub-pixels SPX3 arranged along the second direction DR2).

The gate driver GD applies gate driving signals to pixels PX of the display area DA through scan lines extending along the first direction DR1. The gate driver GD may be adjacent to one short side of the display area DA. Two gate drivers GD may be disposed on two short sides of the display area DA, respectively.

The scan lines may include a first scan line SL1 and a second scan line SL2. Gate pads may be electrically connected to the gate driver GD and may be disposed on the non-display area NDA of the substrate SUB. The first scan line SL1 and the second scan line SL2 may be electrically and/or directly connected to the same gate pad or to two separate gate pads. The first scan line SL1 and the second scan line SL2 may be respectively connected to the first pixel row and the second pixel row.

The data driver DD applies data driving signals to pixels PX of the display area DA through data lines extending along the second direction DR2. The data driver DD may be adjacent to one long side (lower long side) of the display area DA. The data lines may include a first data line DL1 and a second data line DL2 which pass through the first sub-pixel column of one pixel column. Data lines analogous to the first data line DL1 and the second data line DL2 may pass through the second sub-pixel column and the third sub-pixel column of the one pixel column. The first data line DL1 and the second data line DL2 may be spaced from each other along the first direction DR1. Each of the data lines DL1 and DL2 may be connected to some pixels PX disposed in a sub-pixel column of one pixel column.

Figure 2:
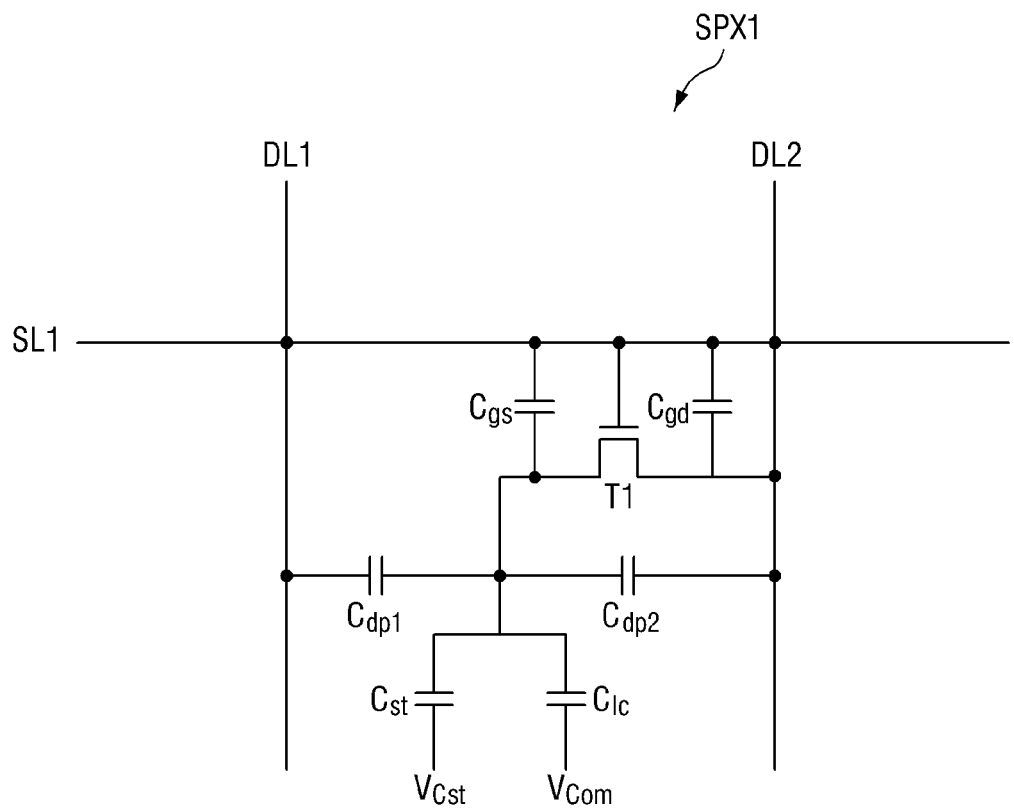
FIG. 2 is an equivalent circuit diagram of a first sub-pixel according to one embodiment.

FIG. 2 is an equivalent circuit diagram of a first sub-pixel according to one embodiment.

FIG. 2 illustrates an equivalent circuit diagram of the first sub-pixel SPX1 among the sub-pixels SPX1, SPX2, and SPX3 of a pixel PX. The equivalent circuit diagrams of the second sub-pixel SPX2 and the third sub-pixel SPX3 may be substantially the same as the equivalent circuit diagram of the first sub-pixel SPX1.

The first sub-pixel SPX1 may include a first transistor T1. A first electrode (e.g., a source electrode) of the first transistor T1 may be connected to the second data line DL2, a second electrode (e.g., a drain electrode) of the first transistor T1 may be connected to a sub-pixel electrode 190 (illustrated in FIG. 4), and the gate electrode of the first transistor T1 may be connected to the first scan line SL.

A liquid crystal capacitor $C_{lc}$ may be formed between the sub-pixel electrode 190 and a common electrode to which a common voltage $V_{Com}$ is applied, and a storage capacitor $C_{st}$ may be formed between the sub-pixel electrode 190 and a storage line to which a storage voltage $V_{st}$ is applied.

A gate-drain capacitor $C_{gd}$ may be formed between the first electrode of the first transistor T1 and the first scan line SL1, and a gate-source capacitor $C_{gs}$ may be formed between the second electrode of the first transistor T1 and the first scan line SL1.

A first data pixel capacitor $C_{dp1}$ may be formed between the sub-pixel electrode 190 and the first data line DL1, and a second data pixel capacitor $C_{dp2}$ may be formed between the sub-pixel electrode 190 and the second data line DL2.

Figure 3:
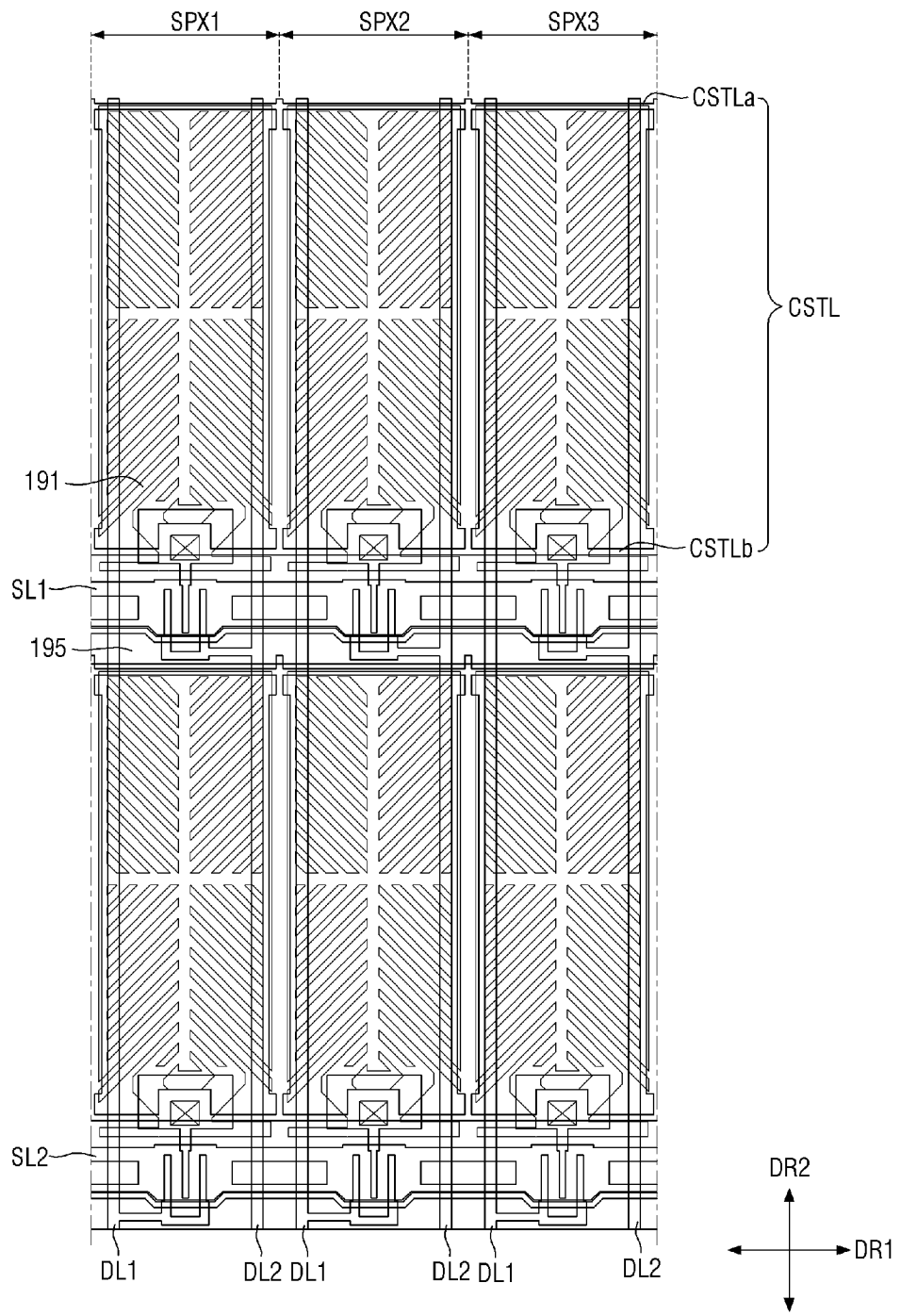
FIG. 3 is a layout diagram (or plan view) of a pixel according to one embodiment.
Figure 4:
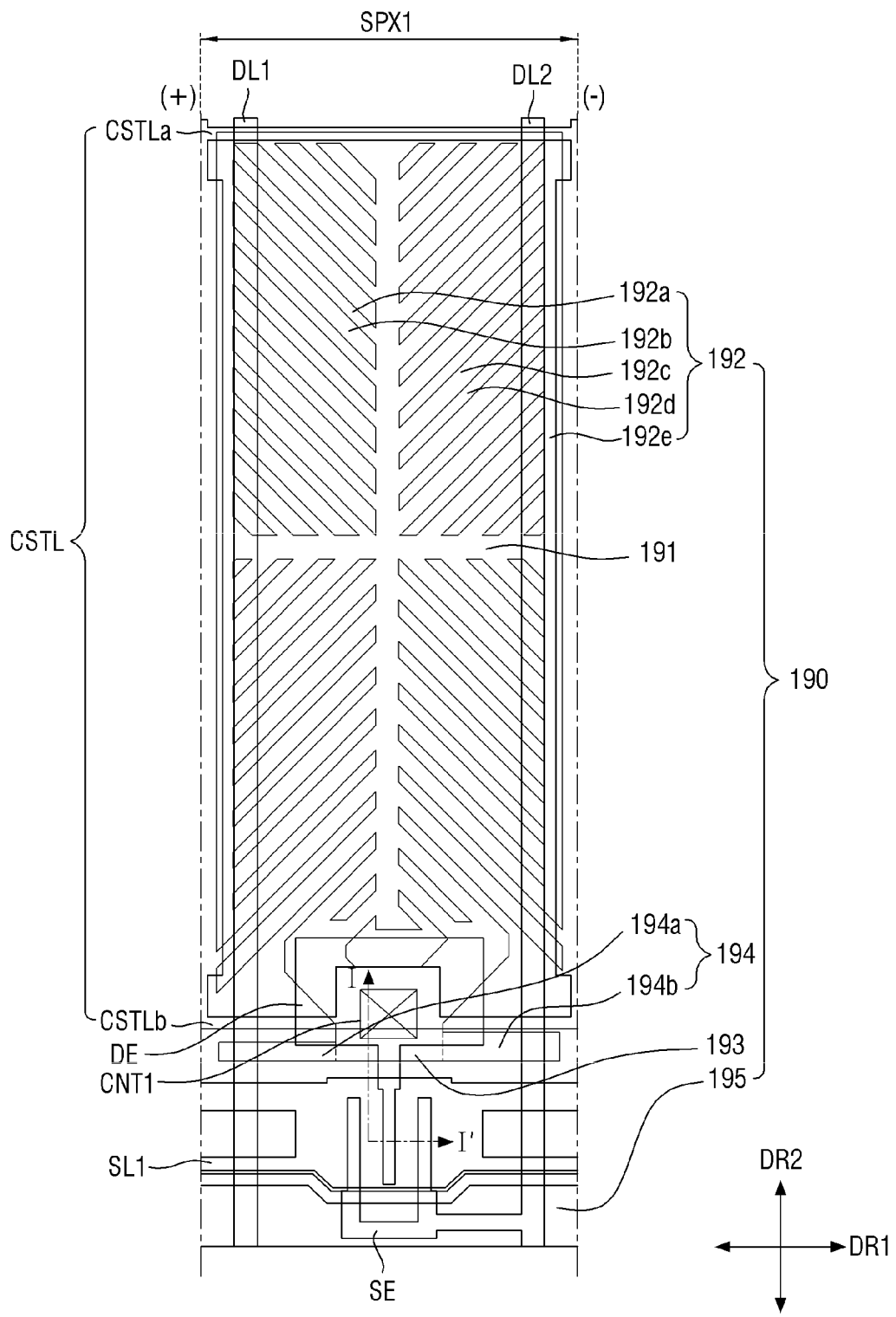
FIG. 4 is a layout diagram of a first sub-pixel of a pixel according to one embodiment.

FIG. 3 is a layout diagram of a pixel according to one embodiment. FIG. 4 is a layout diagram of a first sub-pixel of a pixel according to one embodiment.

Referring to FIG. 3 and FIG. 4, the pixel PX may include the sub-pixels SPX1, SPX2, and SPX3. FIG. 3 illustrates the pixel PX of the first pixel row and the pixel PX in the second pixel row adjacent to the first pixel row in the second direction DR2, described with reference to FIG. 1.

The first scan line SL1 extending along the first direction DR1 may pass the sub-pixels SPX1, SPX2, and SPX3 of the pixel PX in the first pixel row. The second scan line SL2 extending along the first direction DR1 may pass the sub-pixels SPX1, SPX2, and SPX3 of the pixel PX in the second pixel row. The first scan line SL1 and the second scan line SL2 may be connected to one gate pad or two gate pads.

A sub-pixel electrode 190 (illustrated in FIG. 4) may be disposed in each of the sub-pixels SPX1, SPX2, and SPX3. The data lines DL1 and DL2 may pass through each of the sub-pixels SPX1, SPX2, and SPX3. The first transistor T1 of each of the sub-pixels SPX1, SPX2, and SPX3 of the pixel PX in the first pixel row may have a first electrode connected to a second data line DL2, and the first transistor T1 of each of the sub-pixels SPX1, SPX2, and SPX3 of the pixel PX in the second pixel row may have a first electrode connected to a first data line DL1.

The first electrode of the first transistor T1 of each sub-pixel SPX1, SPX2, SPX3 of the pixel PX in the first pixel row may be directly connected to the second data line DL2 and may protrude from the second data line DL2 toward the first data line DL1 overlapping the corresponding sub-pixel SPX1, SPX2, SPX3. The first electrode of the first transistor T1 of each sub-pixel SPX1, SPX2, SPX3 of the pixel PX in the second pixel row may be directly connected to the first data line DL1 and may protrude from the first data line DL1 toward the second data line DL2 overlapping the corresponding sub-pixel SPX1, SPX2, SPX3. The first electrode of the first transistor T1 may include a U-shaped structure.

The first electrode of the first transistor T1 of each sub-pixel SPX1, SPX2, SPX3 of the pixel PX in the first pixel row may be connected to the first data line DL1, and the first electrode of the first transistor T1 of each sub-pixel SPX1, SPX2, SPX3 of the pixel PX in the second pixel row may be connected to the second data line DL2.

A storage line CSTL may pass through the sub-pixels SPX1, SPX2, and SPX3 of a pixel row. The storage line CSTL may have a grid structure or a mesh structure and may surround sub-pixel SPX1, SPX2 and SPX3. The storage line CSTL may include a first storage line portion CSTLa having a rectangular frame structure, and may include a second storage line portion CSTLb protruding in the second direction DR2 from the first storage line portion CSTLa. The first storage line portions CSTLa of the sub-pixels SPX1, SPX2, and SPX3 adjacent in the first direction DR1 may be directly connected to each other. The first storage line portion CSTLa may partially overlap the sub-pixel electrode 190 of the corresponding sub-pixel SPX1, SPX2, or SPX3. The second storage line portion CSTLb may overlap the second electrode DE1 of the corresponding first transistor T1 in the thickness direction of the display device. The second storage line portion CSTLb and the second electrode DE1 of the corresponding first transistor T1 may form the storage capacitor $C_{st}$ (see FIG. 5). The storage line CSTL and the scan lines SL1 and SL2 may be disposed (directly) on the same insulating layer and may be formed of the same material. The data lines DL1 and DL2 and the second electrode DE1 of the first transistor T1 may be disposed (directly) on the same insulating layer and may be formed of the same material. A shielding layer 195 may be disposed between the first scan line SL1 of the sub-pixels SPX1, SPX2, and SPX3 and an adjacent section of the first storage line portions CSTLa of the sub-pixels SPX1, SPX2, and SPX3 adjacent in the second direction DR2. The shielding layer 195 and the sub-pixel electrode 190 may be disposed directly on the same insulating layer and may be formed of the same material. The shielding layer 195 may partially overlap the first scan line SL1 of the sub-pixels SPX1, SPX2, and SPX3 of the corresponding pixel in the thickness direction of the display device. The shielding layer 195 may prevent field light leakage of the first scan line SL1. The shielding layer 195 may overlap the data lines DL1 and DL2 and the first electrode of the first transistor T1.

A second-direction section of the first storage line portions CSTLa may overlap or correspond to the boundary between two of the sub-pixels SPX1, SPX2, and SPX3 adjacent in the first direction DR1. A first-direction section of the first storage line portions CSTLa may overlap or correspond to a boundary between two pixel rows.

Figure 5:
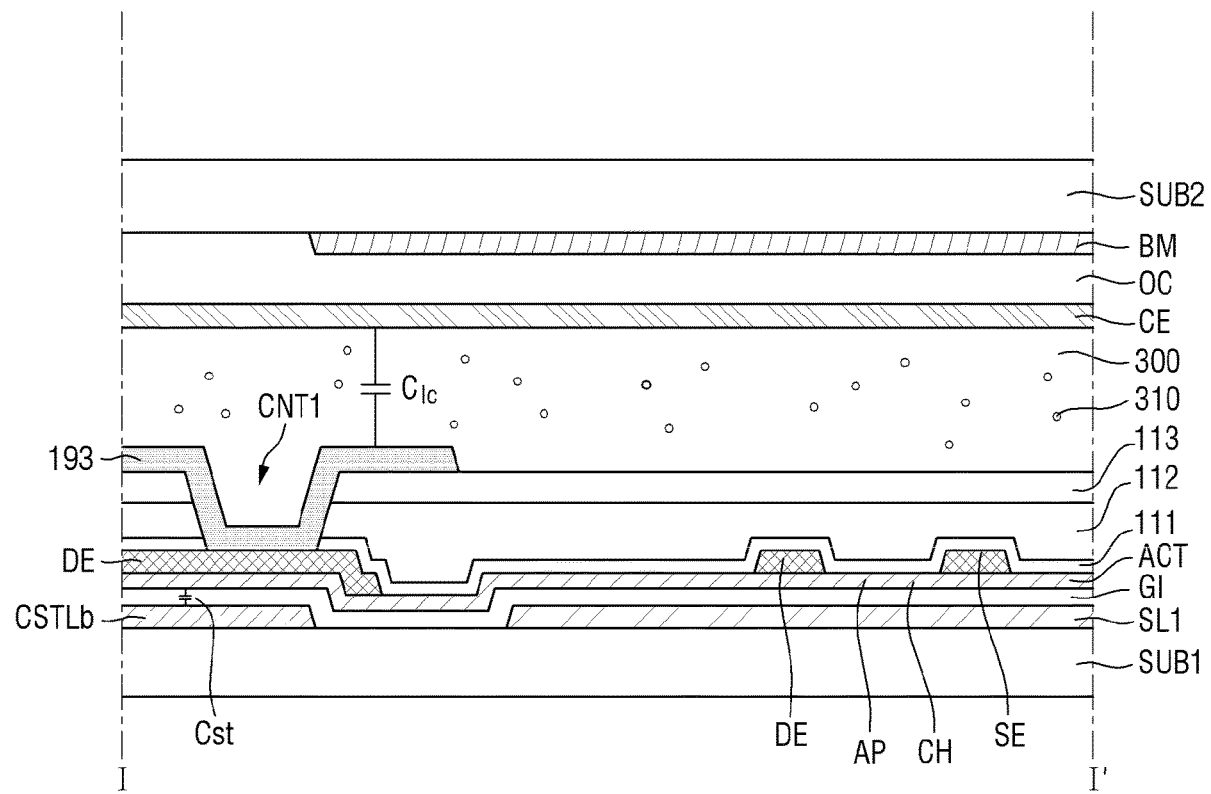
FIG. 5 is a cross-sectional view taken along line I-I' of FIG. 4 according to one embodiment.

FIG. 4 is a layout diagram of a first sub-pixel SPX1 of a pixel according to one embodiment. FIG. 5 is a cross-sectional view taken along line I-I' of FIG. 4 according to one embodiment. but the related description may be applied to the second sub-pixel SPX2 and the third sub-pixel SPX3.

Referring to FIGS. 1, 4, and 5, the substrate SUB may include at least one of a first substrate SUB1 and a second substrate SUB2 overlapping the first substrate SUB1. The pixel structures described above may be disposed on the first substrate SUB1, and a common electrode CE may be disposed on the second substrate SUB2. A liquid crystal layer 300 including liquid crystal molecules 310 may be disposed between the pixel structures and the common electrode CE.

The first substrate SUB1 may be made of an insulating material such as glass, quartz, or polymer resin. The polymeric material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination of some of the above materials. The first substrate SUB1 may include a metal material.

A first conductive layer may be disposed on the first substrate SUB1. The first conductive layer may include the scan lines SL1 and SL2, a first gate electrode GE1, and the storage line CSTL. The first gate electrode GE1 may be the gate electrode of the first transistor T1.

The scan lines SL1 and SL2, the first gate electrode GE1, and the storage line CSTL may be included in a first metal layer made of the same material and may be located directly on the same layer (e.g., the first substrate SUB1). The first metal layer may include a single layer or multiple layers. The single layer may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W) and copper (Cu), or an alloy of some of the above materials. The multiple layers may include at least two of the aforementioned materials. For example, the first metal layer may include a molybdenum-aluminum-neodymium layered structure, a molybdenum-aluminum layered structure, or a copper-titanium layered structure.

The first gate electrode GE1 may be electrically connected to the first scan line SL1. The first gate electrode GE1 of the first transistor T1 of the second pixel row adjacent to the first pixel row in the second direction DR2 may be electrically connected to the second scan line SL2.

A gate insulating layer GI is disposed on the scan lines SL1 and SL2, the first gate electrode GE1, and the storage line CSTL to insulate the scan lines SL1 and SL2, the first gate electrode GE1, and the storage line CSTL from a second conductive layer. The gate insulating layer GI may include an inorganic insulating material such as a silicon compound and a metal oxide. For example, the gate insulating layer GI may include silicon oxide, silicon nitride, silicon oxynitride, aluminum oxide, tantalum oxide, hafnium oxide, zirconium oxide, titanium oxide, or a combination of some of the above materials. The gate insulating layer GI may be/include a single layer or multiple layers of different materials.

A semiconductor layer ACT is positioned on the gate insulating layer GI. The semiconductor layer may include a semiconductor pattern AP. The semiconductor pattern AP may overlap the first electrode SE, the second electrode DE, and the first gate electrode GE1 of the first transistor T1. The semiconductor pattern AP of the semiconductor layer includes a channel region CH. The channel region CH may overlap the first gate electrode GE1 of the first transistor T1. When an electric field is applied by the first gate electrode GE1, the channel region CH may become conductive between the electrodes SE and DE to form a channel.

The semiconductor layer ACT may include a silicon-based semiconductor material such as amorphous silicon, polycrystalline silicon, monocrystalline silicon, or the like. The semiconductor layer ACT may include monocrystalline silicon, low temperature polycrystalline silicon, amorphous silicon, or the like. The semiconductor layer ACT may include an oxide semiconductor. The semiconductor layer ACT may include, for example, a binary compound (ABx), a ternary compound (ABxCy), or a quaternary compound (ABxCyDz) containing at least one of indium (In), zinc (Zn), gallium (Ga), tin (Sn), titanium (Ti), aluminum (Al), hafnium (Hf), zirconium (Zr), magnesium (Mg) and the like. The semiconductor layer ACT may include ITZO (an oxide including indium, tin and titanium) or IGZO (an oxide including indium, gallium and tin).

An ohmic contact layer may be disposed on the semiconductor layer ACT. The ohmic contact layer may be disposed between each of the electrodes SE and DE and the semiconductor layer ACT, thereby decreasing a Schottky barrier between metal and silicon to decrease a contact resistance. The ohmic contact layer may be formed of amorphous silicon doped with n-type impurities at a high concentration.

The second conductive layer may be disposed between the first substrate SUB1 and the semiconductor layer ACT. The second conductive layer may include the data lines DL1 and DL2, the electrode SE and the electrode DE of the first transistor T1. The data lines DL1 and DL2, the electrode SE and the electrode DE of the first transistor T1 may be formed of the same material and may be located directly on the same layer (e.g., the gate insulating layer GI).

The second metal layer may include a single layer or multiple layers. The single layer may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W) and copper (Cu), or an alloy of some of the above materials. The multiple layers may include at least two of the aforementioned materials. For example, the second metal layer may include a molybdenum-aluminum-neodymium layered structure, a molybdenum-aluminum layered structure, or a copper-titanium layered structure.

The electrode SE of the first transistor T1 may be disposed on the semiconductor layer ACT and may be electrically connected to the semiconductor pattern AP. The electrode DE of the first transistor T1 may be disposed on the semiconductor layer ACT and may be electrically connected to the semiconductor pattern AP. The electrode DE of the first transistor T1 may be spaced apart from the electrode SE of the first transistor T1 along the second direction DR2. The electrode DE of the first transistor T1 may have substantially rectangular shape and may protrude in the second direction DR2 toward the corresponding electrode SE. A portion of the electrode DE of the first transistor T1 may be surrounded by the electrode SE in a plan view of the display device. Data voltages having different polarities may be applied to the first data line DL1 and the second data line DL2. For example, a positive/negative data voltage may be applied to the first data line DL1, and a negative/positive data voltage may be applied to the second data line DL2.

A first insulating layer 111 may be disposed over the first substrate SUB1 and the first transistor T1. The first insulating layer 111 may include an inorganic insulating material. The first insulating layer 111 may include an organic insulating material.

Color filters 112 may be disposed on the first insulating layer 111. The color filters 112 may include a red color filter, a green color filter, and a blue color filter. The red color filter, the green color filter, and the blue color filter may be disposed in the first sub-pixel SPX1, the second sub-pixel SPX2, the third sub-pixel SPX3, respectively. The red color filter, the green color filter, and the blue color filter may or may not overlap each other at the boundary between two of the sub-pixels SPX1, SPX2 and SPX3.

A second insulating layer 113 may be disposed on the color filters 112. The second insulating layer 113 may be an overcoat layer. The second insulating layer 113 may include an organic insulating material.

A third conductive layer may be disposed (directly) on the second insulating layer 113. The third conductive layer may include the sub-pixel electrode 190 and the shielding layer 195. The sub-pixel electrode 190 may include a stem electrode 191 having a horizontal electrode (or first stem electrode) extending along the first direction DR1 and a vertical electrode (or second stem electrode) extending along the second direction DR2. The stem electrode 191 may have a cross shape in a plan view of the display device. The sub-pixel electrode 190 and/or the branch electrodes of the sub-pixel electrode 190 may be divided into a plurality of domains by the stem electrode 191. The sub-pixel electrode 190 may be divided into four domains by the stem electrode 191. The four domains may include a first domain located on the upper left side from the stem electrode 191, a second domain located on the lower left side from the stem electrode 191, a third domain located on the upper right side from the stem electrode 191, and a fourth domain located on the lower right side from the stem electrode 191. An edge electrode 192e of the sub-pixel electrode 190 may be disposed at the edge of the sub-pixel electrode 190. The edge electrode 192e may substantially surround the stem electrode 191 in a plan view of the display device. The edge electrode 192e may have a rectangular frame shape including long sides and at least one short side in a plan view of the display device. The sub-pixel electrode 190 may include slit patterns and branch electrodes connected to the stem electrode 191 and the edge electrode 192e. Slit patterns and the branch electrodes may be disposed in each of the first to fourth domains. The number of the slit patterns and the branch electrodes may be plural.

The slit patterns and the branch electrodes located in the first domain may extend in an upper left direction between the first direction DR1 and the second direction DR2. The slit patterns and the branch electrodes located in the second domain may extend in a lower left direction between the first direction DR1 and the second direction DR2. The slit patterns and the branch electrodes located in the third domain may extend in an upper right direction between the first direction DR1 and the second direction DR2. The slit patterns and the branch electrodes located in the fourth domain may extend in a lower right direction between the first direction DR1 and the second direction DR2.

The slit patterns and the branch electrodes may be bilaterally asymmetric. In one embodiment, the branch electrodes 192a and the slit patterns 192b disposed in the first and second domains may be asymmetric with the branch electrodes 192c and the slit patterns 192d disposed in the third and fourth domains.

For example, as illustrated in FIG. 4, with respect to a vertical section of the stem electrode 191 positioned at the boundary between the first domain and the third domain, at a starting portion of the section of the stem electrode 191 (vertical electrode), a slit pattern 192b may be disposed in the first domain, whereas a branch electrode 192c may be disposed in the third domain, and at an upper portion adjacent to the starting portion of the stem electrode 191 in the second direction DR2, a branch electrode 192a may be disposed in the first domain, whereas a slit pattern 192d may be disposed in the third domain. Slit patterns 192b and branch electrodes 192a are alternately disposed from the starting portion of the stem electrode 191 in the first domain, and branch electrodes 192c and slit patterns 192d are alternately disposed from the starting portion of the stem electrode 191 in the third domain.

That is, the branch electrodes of the first and third domains may be alternately arranged with respect to the stem electrode 191 (vertical electrode).

Analogous alternate structures may be applicable to the branch electrodes of the first domain and the second domain with respect to a horizontal section of the stem electrode 191, may be applicable to the branch electrodes of the second domain and the fourth domain with respect to a vertical section of the stem electrode 191, and may be applicable to the branch electrodes of the third domain and the fourth domain with respect to a horizontal section of the stem electrode 191.

The structure of the sub-pixel electrode 190 may minimize visibility of a dark portion due to the horizontal electrode and the vertical electrode.

The stem electrode 191, the branch electrodes 192a and 192c, the slit patterns 192b and 192d, and the edge electrode 192e may form a first pixel electrode portion/set of the sub-pixel electrode 190.

The sub-pixel electrode 190 may further include a pixel connection portion 193 (second pixel electrode portion/set or connecting member) protruding from the branch electrodes 192a and 192c of the second domain and the fourth domain in the second direction DR2. The pixel connection portion 193 may be electrically connected to the electrode DE of the first transistor T1 through a first contact hole CNT1 penetrating the second insulating layer 113, the color filters 112, and the first insulating layer 111.

The third conductive layer may be formed of a transparent material through which light can be transmitted. The third conductive layer may be formed of, for example, indium tin oxide (ITO), indium zinc oxide (IZO), or indium tin zinc oxide (ITZO). A material that is transparent and conductive may be used as the third conductive layer.

The sub-pixel electrode 190 may further include compensation portions 194 (protrusions or compensation portions 194a and 194b) which protrude from opposite edges/sides of the pixel connection portion 193 to a first side (left side) and a second side (right side), respectively, in the first direction DR1. The compensation portions 194 may be included in the third conductive layer.

The first compensation portion 194a may overlap the first data line DL1 in the thickness direction of the display device, and the second compensation portion 194b may overlap the second data line DL2 in the thickness direction of the display device. The widths of the first and second compensation portions 194a and 194b may be different from each other.

The second substrate SUB2 may be provided with a light blocking member BM and the common electrode CE.

The second substrate SUB2 may be a transparent insulating substrate similarly to the first substrate SUB1. Further, the second substrate SUB2 may include a polymer or plastic of high thermal resistance. The second substrate SUB2 may have flexibility.

The light blocking member BM is positioned directly on one surface of the second substrate SUB2 facing the first substrate SUB1. The light blocking member BM may overlap a switching element area. The light blocking member BM may include a light blocking pigment such as carbon black, an opaque material such as chromium (Cr), or a photosensitive organic material. The light blocking member BM may be disposed on the first substrate SUB1. An overcoat layer OC may be disposed on the light blocking member BM. The common electrode CE may be disposed on the overcoat layer OC. The common electrode CE may be formed of a transparent conductive material such as indium tin oxide (ITO), indium zinc oxide (IZO), or indium tin zinc oxide (ITZO). The common electrode CE may be formed over the entire surface of the second substrate SUB2. The common electrode CE may be applied with a common voltage to form an electric field with the sub-pixel electrode 190, thereby forming the liquid crystal capacitor $C_{lc}$. Orientations of the liquid crystal molecules 310 of the liquid crystal layer 300 may be controlled by the electric field, so that light transmittance can be controlled.

The liquid crystal layer 300 is disposed between the first substrate SUB1 and the second substrate SUB2. The liquid crystal layer 300 may include the liquid crystal molecules 310 having dielectric anisotropy. When an electric field is applied between the first substrate SUB1 and the second substrate SUB2, the liquid crystal molecules 310 rotate in a specific direction between the first substrate SUB1 and the second substrate SUB2, thereby adjusting a phase retardation value of light passing through the liquid crystal layer 300. The amount of polarized light (e.g., light that has passed through a lower polarization member) passing through an upper polarization member (disposed on the emission side, for example, attached to the outer surface of the second substrate) varies according to the adjustment amount of the phase retardation value by the rotation of the liquid crystal molecules 310, so that the light transmittance can be controlled.

Figure 6:
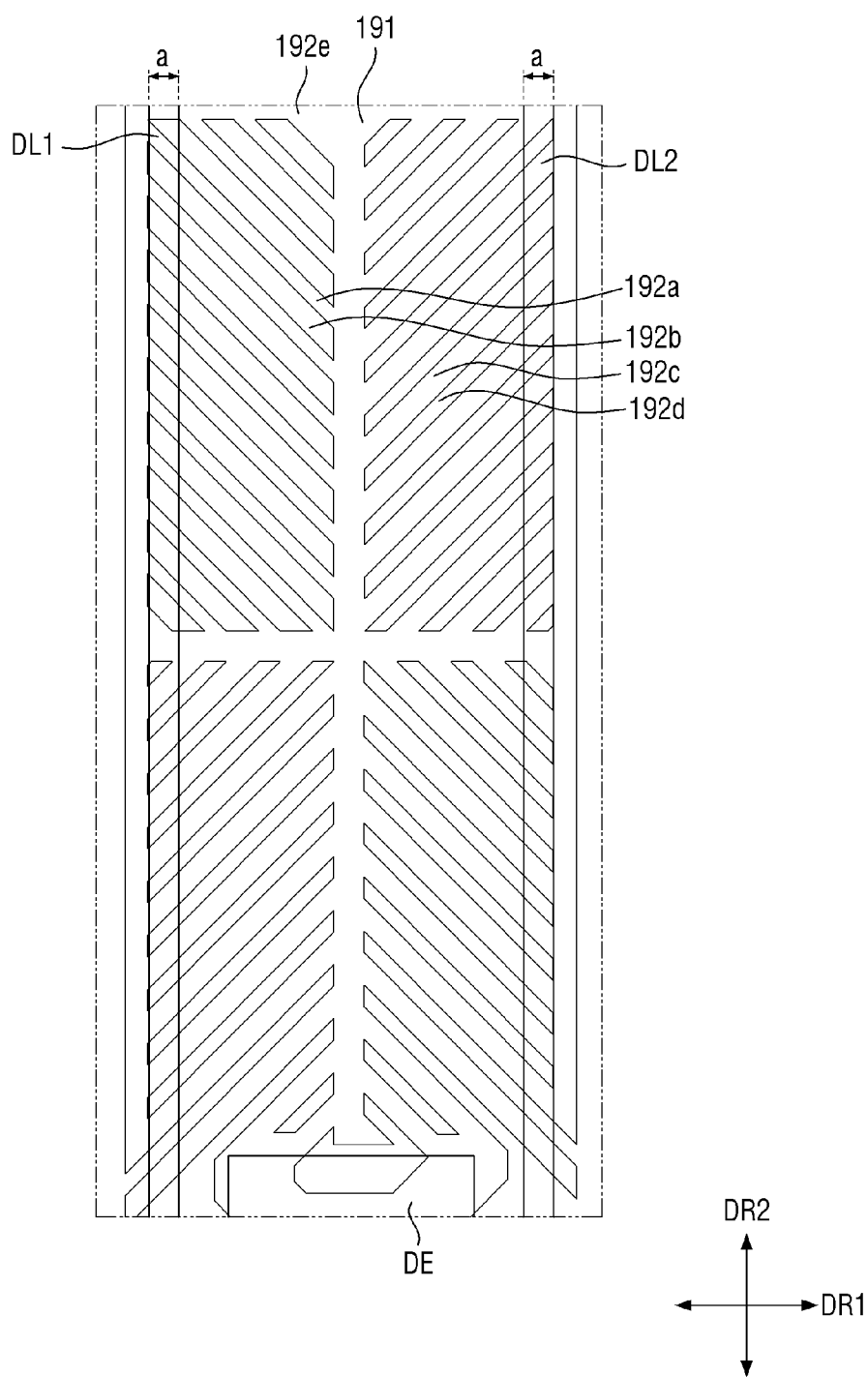
FIG. 6 is a plan view illustrating data lines and a first pixel electrode portion of FIG. 4 according to one embodiment.

FIG. 6 is a plan view illustrating the data lines and the first pixel electrode portion of FIG. 4 according to one embodiment. FIG. 7 is diagram for comparing an overlapping area of the first data line and the first compensation portion with an overlapping area of the second data line and the second compensation portion according to one embodiment.

FIG. 6 illustrates the overlapping area between the sub-pixel electrode 190 and the data line DL1 and illustrates the overlapping area between the sub-pixel electrode 190 and the data line DL2.

When the width of the data lines DL1 and DL2 is denoted by 'a,' since the slit patterns 192b and 192d, and the branch electrodes 192a and 192c of the domains are asymmetrically arranged with respect to the vertical electrode of the sub-pixel electrode 190, the overlapping area between the first data line DL1 and the branch electrodes 192a, the slit patterns 192b, and the edge electrode 192e of the sub-pixel electrode 190 in the first and second domains on the left side may be unequal to the overlapping area between the second data line DL2 and the branch electrodes 192c, the slit patterns 192d, and the edge electrode 192e of the sub-pixel electrode 190 in the third and fourth domains on the right side. For example, the overlapping area between the first data line DL1 and the branch electrodes 192a, the slit patterns 192b, and the edge electrode 192e of the sub-pixel electrode 190 in the first and second domains on the left side may be greater than the overlapping area between the second data line DL2 and the branch electrodes 192c, the slit patterns 192d, and the edge electrode 192e of the sub-pixel electrode 190 in the third and fourth domains on the right side.

A difference between the overlapping area between the sub-pixel electrode 190 and the data line DL1 and the overlapping area between the sub-pixel electrode 190 and the data line DL2 may cause a difference between the data pixel capacitors $C_{dp1}$ and $C_{dp2}$ described with reference to FIG. 2. Since the overlapping area between the first data line DL1 and the branch electrodes 192a, the slit patterns 192b, and the edge electrode 192e of the sub-pixel electrode 190 in the first and second domains on the left side is greater than the overlapping area between the second data line DL2 and the branch electrodes 192c, the slit patterns 192d, and the edge electrode 192e of the sub-pixel electrode 190 in the third and fourth domains on the right side, a data pixel capacitance value of the first data pixel capacitor $C_{dp1}$ may be greater than a data pixel capacitance value of the second data pixel capacitor $C_{dp2}$.

When the data pixel capacitance value of the first data pixel capacitor $C_{dp1}$ is different from the data pixel capacitance value of the second data pixel capacitor $C_{dp2}$, the voltage of the sub-pixel electrode 190 may be distorted by the data lines DL1 and DL2, which transmit data voltages having different polarities. Accordingly, it may be preferable to minimize the difference between the data pixel capacitance values of the first data pixel capacitor $C_{dp1}$ and the second data pixel capacitor $C_{dp2}$.

Accordingly, the sub-pixel electrode 190 may include the compensation portions 194a and 194b. The compensation portions 194a and 194b are included in the third conductive layer and are electrically connected to the first sub-pixel electrode portion of the sub-pixel electrode 190. The overlapping areas between the compensation portions 194a and 194b and the data lines DL1 and DL2 may compensate the difference between the data pixel capacitance values of the first data pixel capacitor $C_{dp1}$ and the second data pixel capacitor $C_{dp2}$.

As illustrated in FIG. 6, when the data pixel capacitance value of the first data pixel capacitor $C_{dp1}$ is greater than the data pixel capacitance value of the second data pixel capacitor $C_{dp2}$, the width of the second compensation portion 194b in the second direction DR2 which overlaps the second data line DL2 is made greater than the width of the first compensation portion 194a in the second direction DR2 which overlaps the first data line DL1. Thus, it is possible to balance the first data pixel capacitor $C_{dp1}$ and the second data pixel capacitor $C_{dp2}$.

As shown in FIG. 7, when the first compensation portion 194a has a first width y1 in the second direction DR2, and the second compensation portion 194b has a second width y2 in the second direction DR2, the second width y2 may be greater than the first width y1. Each of the widths y1 and y2 of the compensation portions 194a and 194b may be constant along the extension/lengthwise direction (first direction DR1) of the compensation portions 194a and 194b.

As the compensation portions 194 of the sub-pixel electrode 190 compensate the difference between the data pixel capacitors present between the data lines DL1 and DL2 and the sub-pixel electrode 190, it is possible to prevent the voltage distortion of the sub-pixel electrode due to the difference between the data pixel capacitors.

In the following description, description of above-described features may not be repeated.

Figure 8:
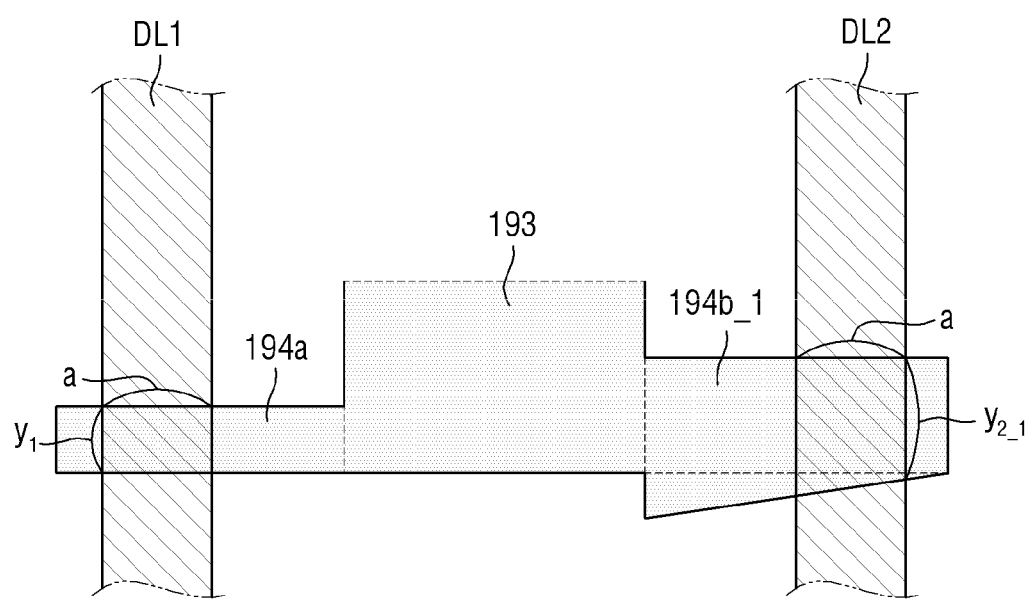
FIG. 8 is a plan view showing a second compensation portion according to one embodiment.

FIG. 8 is a plan view showing a second compensation portion according to an embodiment.

Referring to FIG. 8, a second compensation portion 194b_1 is different from the second compensation portion 194b illustrated in FIG. 7 in that the second width y2_1 may decrease as for sections of the second compensation portion 194b positioned farther from the pixel connection portion 193.

For example, the second width y2_1 of the second compensation portion 194b_1 may gradually, linearly, and/or nonlinearly decrease.

As the compensation portions 194 of the sub-pixel electrode 190 compensate the difference between the data pixel capacitors present between the data lines DL1 and DL2 and the sub-pixel electrode 190, it is possible to prevent the voltage distortion of the sub-pixel electrode due to the difference between the data pixel capacitors.

Figure 9:
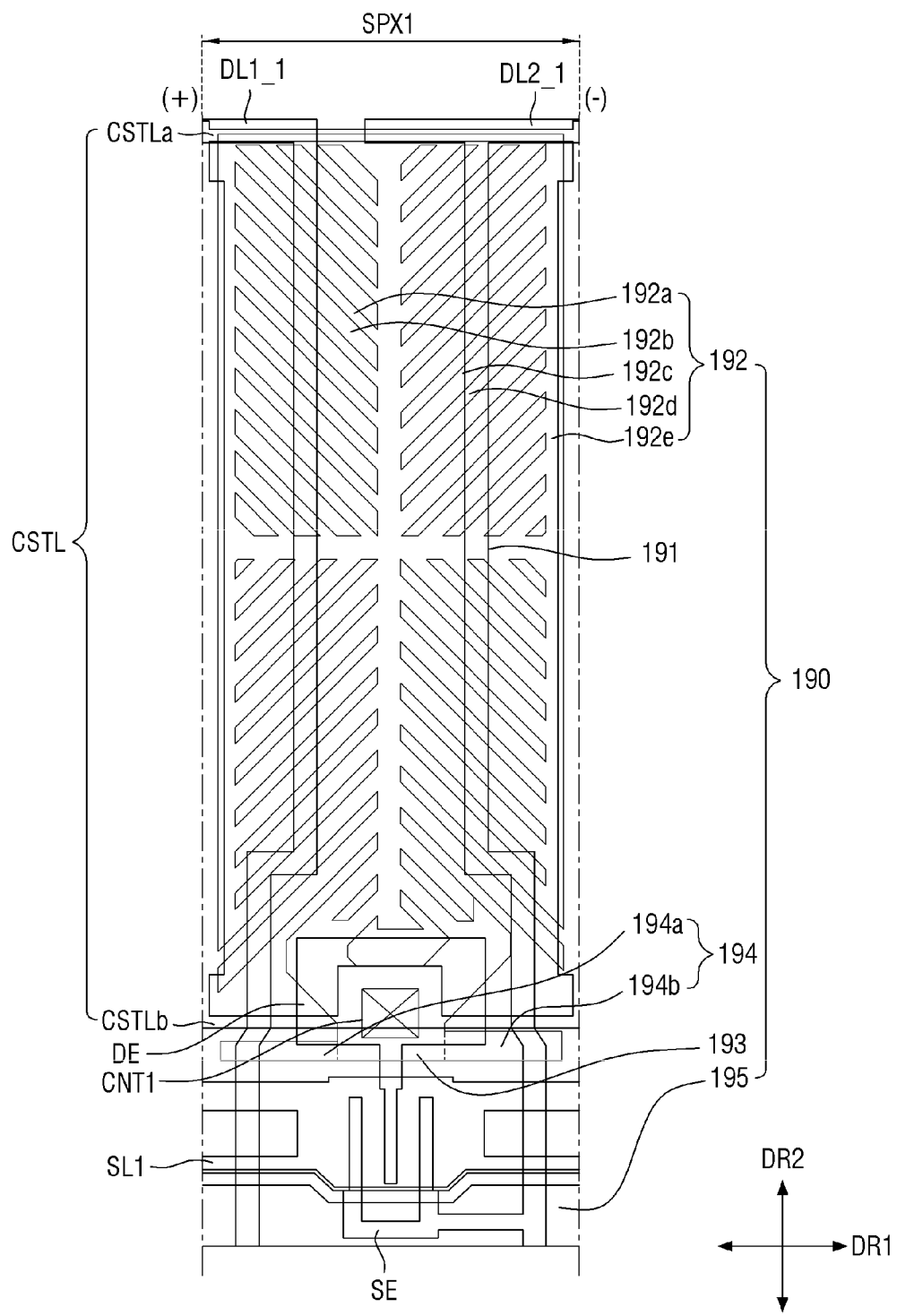
FIG. 9 is a layout diagram of a first sub-pixel of a pixel according to one embodiment.

FIG. 9 is a layout diagram of a first sub-pixel of a pixel according to an embodiment.

Referring to FIG. 9, data lines DL1_1 and DL2_1 may include sections extending in directions different from the second direction DR2.

For example, a section of the first data line DL1_1 may be lengthwise in the first direction DR1 at the upper side of the edge electrode 192e, and a section of the second data line DL2_1 may be lengthwise in the first direction DR1 at the upper side of the edge electrode 192e. The data lines DL1_1 and DL2_1 may further include sections that are lengthwise in the first direction DR1 in the second domain and the fourth domain, respectively.

The slit patterns and branch electrodes in the left domain and right domain may be asymmetrically and alternately arranged with respect to the stem electrode 191. Therefore, the difference between the data pixel capacitors $C_{dp1}$ and $C_{dp2}$ present between the sub-pixel electrode 190 and the data lines DL1_1 and DL2_1 may be significant.

Advantageously, as the compensation portions 194 of the sub-pixel electrode 190 compensate the difference between the data pixel capacitors present between the sub-pixel electrode 190 and the data lines DL1_1 and DL2_1, it is possible to prevent voltage distortion of the sub-pixel electrode.

Figure 10:
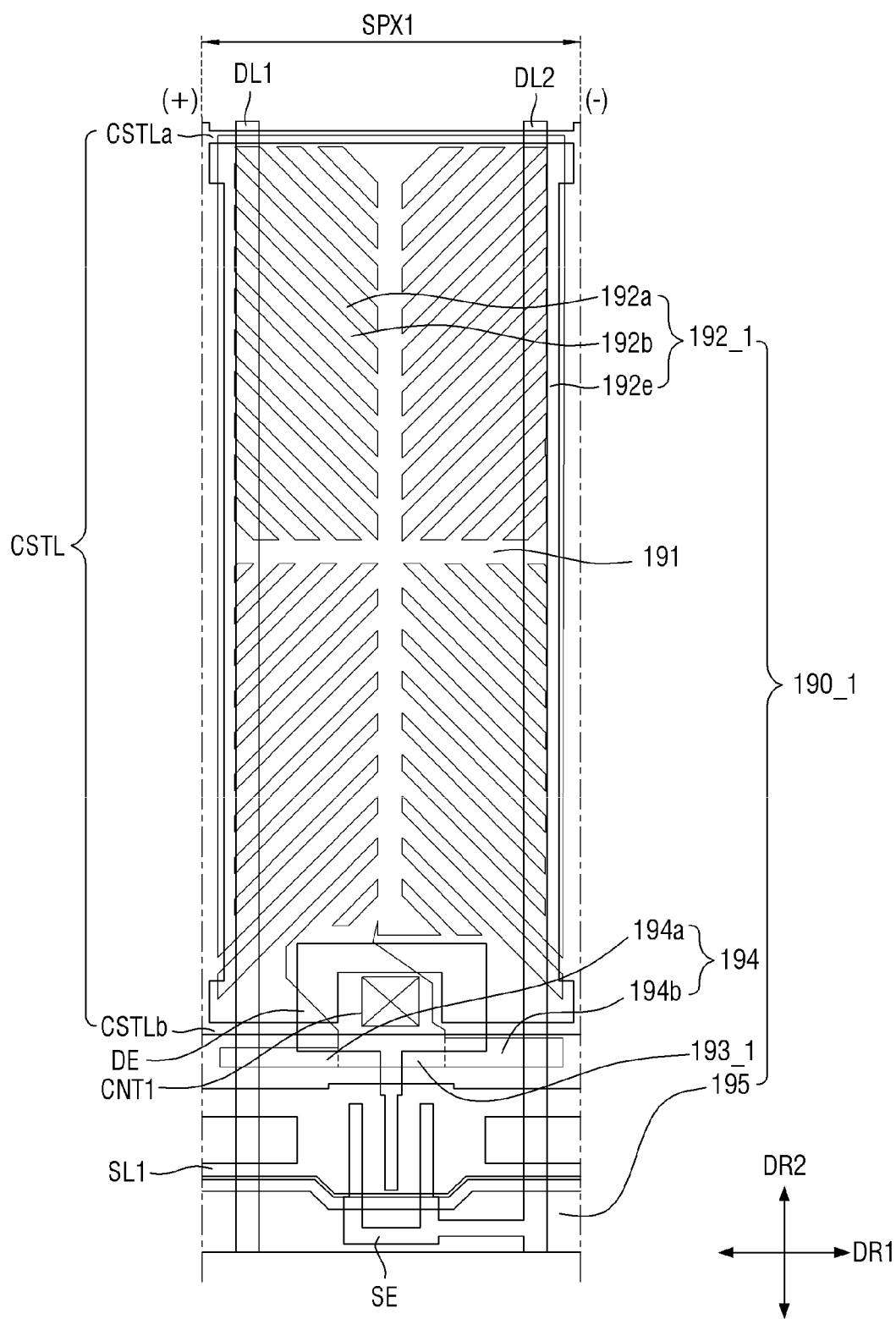
FIG. 10 is a layout diagram of a first sub-pixel of a pixel according to one embodiment.

FIG. 10 is a layout diagram of a first sub-pixel of a pixel according to still an embodiment.

Referring to FIG. 10, branch electrodes of a sub-pixel electrode 190_1 in the left domain (the first and second domains) and the right domain (the third and fourth domains) are bilaterally symmetrical with respect to the stem electrode 191.

That is, branch electrodes 192a and the slit patterns 192b in the left domain may be substantially bilaterally symmetrical with branch electrodes 192a and the slit patterns 192b in the right domain.

Referring to FIG. 10, a pixel connection portion 1931 may extend from a branch electrode 192a of the second domain in the first direction DR1, while being physically spaced apart from the branch electrodes 192a of the fourth domain.

A separation distance between the pixel connection portion 193_1 and the first data line DL1 may be smaller than a separation distance between the pixel connection portion 193_1 and the second data line DL2.

The sub-pixel electrode 190_1 and the data lines DL1 and DL2 may cause the difference between the capacitances of the data pixel capacitors because the pixel connection portion 193_1 is directly connected to only one of the second domain and the fourth domain of the sub-pixel electrode 190_1.

Advantageously, as the compensation portions 194 of the sub-pixel electrode 190_1 compensate the difference between the data pixel capacitors present between the sub-pixel electrode 190_1 and the data lines DL1 and DL2, it is possible to prevent voltage distortion of the sub-pixel electrode.

Figure 11:
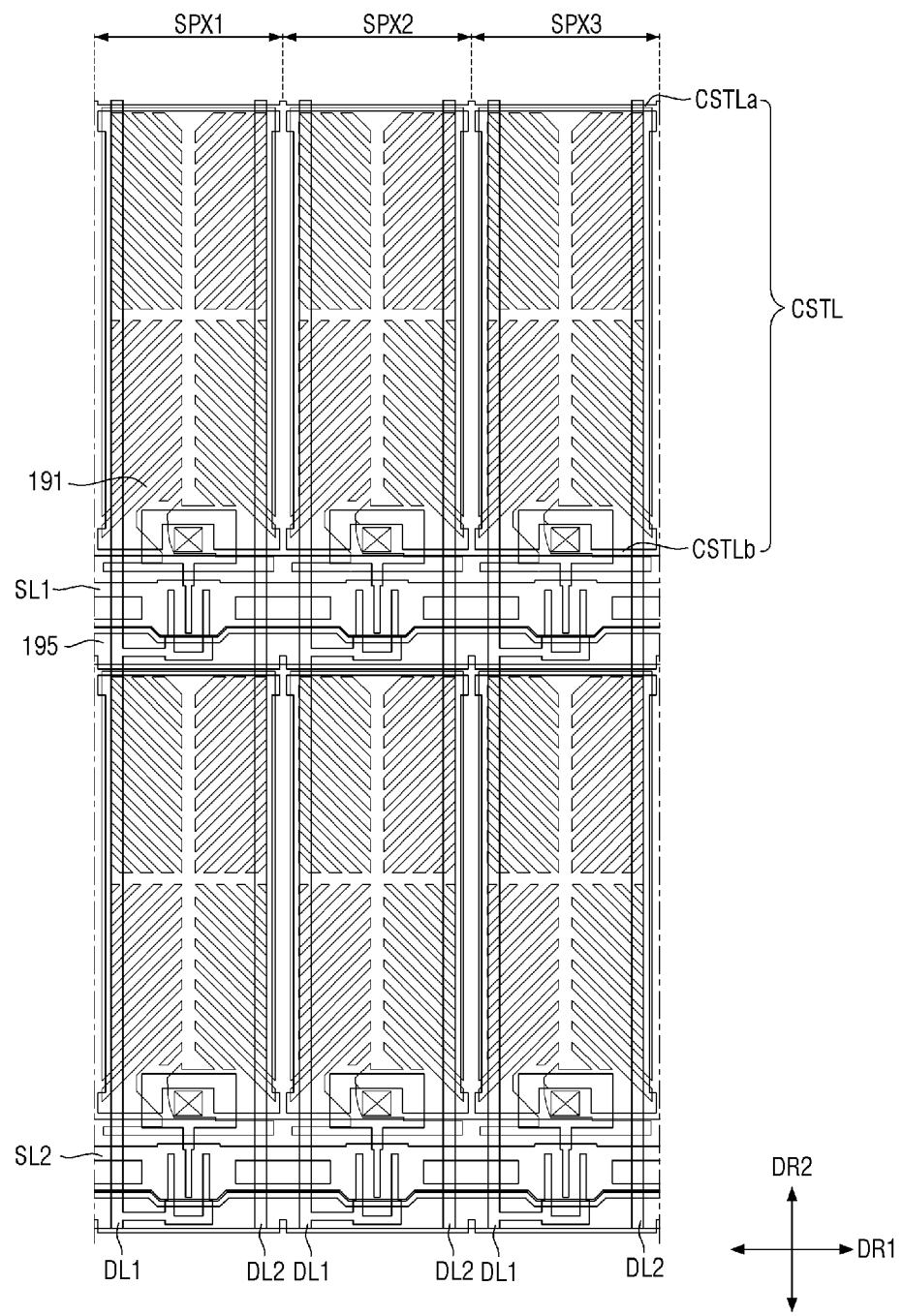
FIG. 11 is a layout diagram of a pixel according to one embodiment.

FIG. 11 is a layout diagram of a pixel according to an embodiment.

Referring to FIG. 11, all of the sub-pixels SPX1, SPX2, and SPX3 of the first pixel row and the sub-pixels SPX1, SPX2, and SPX3 of the second pixel row are electrically connected to first data lines DL1 without being electrically connected to second data lines DL2.

The first electrode of the first transistor T1 of each sub-pixel SPX1, SPX2, SPX3 of each pixel PX in the first pixel row and the second pixel row may be directly connected to a first data line DL1 and may protrude from the first data line DL1 toward the corresponding second data line DL2 that overlaps the corresponding sub-pixel SPX1, SPX2, SPX3. As a result, the first electrode of first transistor T1 of the sub-pixel in the second pixel row may also be positioned closer to the sub-pixel electrode 190 than to the second data line DL2. Accordingly, the data pixel capacitance between the first data line DL1 and the sub-pixel electrode 190 may be greater than the data pixel capacitance between the second data line DL2 and the sub-pixel electrode 190.

Advantageously, as the compensation portions 194 of the sub-pixel electrode 190 compensate the difference between the data pixel capacitors present between the sub-pixel electrode 190, and the data lines DL1 and DL2, it is possible to prevent voltage distortion of the sub-pixel electrode.

The invention claimed is:

1. A display device comprising:
   a first scan line extending lengthwise in a first direction;
   a first data line extending lengthwise in a second direction and crossing the first scan line;
   a second data line extending lengthwise in the second direction and crossing the first scan line;
   a first transistor including a first electrode, a second electrode, and a gate electrode, wherein the first electrode is electrically connected to the second data line, and wherein the gate electrode is electrically connected to the first scan line; and
   a sub-pixel electrode including a first stem electrode, a second stem electrode, a connecting member, a first protrusion, and a second protrusion,
   wherein the first stem electrode extends lengthwise in the first direction and is electrically connected through the second stem electrode and the connecting member to the second electrode of the first transistor,
   wherein the second stem electrode extends lengthwise in the second direction,
   wherein the connecting member overlaps the second electrode of the first transistor,
   wherein the first protrusion protrudes from a first side of the connecting member, extends lengthwise in the first direction, and overlaps the first data line, and
   wherein the second protrusion protrudes from a second side of the connecting member, extends lengthwise in the first direction, and overlaps the second data line.

2. The display device of claim 1, wherein the first side of the connecting member is opposite the second side of the connecting member in the first direction, and wherein at least one of the first side of the connecting member and the second side of the connecting member overlaps the second electrode of the first transistor.

3. The display device of claim 1, wherein the sub-pixel electrode includes an edge electrode directly connected to at least one end of the first stem electrode and directly connected to at most one end of the second stem electrode.

4. The display device of claim 3, wherein the sup-pixel electrode includes branch electrodes that are directly connected to at least one of the first stem electrode, the second stem electrode, and the edge electrode, wherein the branch electrodes are divided into four domains by the first stem electrode and the second stem electrode, and wherein the four domains include a first domain, a second domain adjacent to the first domain in the second direction, a third domain adjacent to the first domain in the first direction, and a fourth domain adjacent to the third domain in the second direction.

5. The display device of claim 4, wherein the sub-pixel electrode includes slits between adjacent branch electrodes in each of the four domains.

6. The display device of claim 5, wherein the first data line overlaps the first domain and the second domain, and wherein the second data line overlaps the third domain and the fourth domain.

7. The display device of claim 6, wherein a maximum overlap between the first data line and branch electrodes of the first and second domains is greater than or less than a maximum overlap between the second data line and branch electrodes of the third and fourth domains.

8. The display device of claim 7, wherein branch electrodes of the first domain are alternately arranged with branch electrodes of the third domain.

9. The display device of claim 8, wherein the maximum overlap between the first data line and the branch electrodes of the first and second domains is greater than the maximum overlap between the second data line and the branch electrodes of the third and fourth domains.

10. The display device of claim 9, a capacitance caused by the maximum overlap between the first data line and the branch electrodes of the first and second domains is greater than a capacitance caused by the maximum overlap between the second data line and the branch electrodes of the third and fourth domains.

11. The display device of claim 10, wherein a maximum overlap between the second protrusion and the second data line is greater than a maximum overlap between the first protrusion and the first data line.

12. The display device of claim 11, wherein a capacitance caused by the maximum overlap between the second protrusion and the second data line is greater than a capacitance caused by the maximum overlap between the first protrusion and the first data line.

13. The display device of claim 6, wherein the connecting member is electrically connected through at least one of a branch electrode of the second domain and a branch electrode of the fourth domain to the second stem electrode.

14. The display device of claim 6, wherein the connecting member is electrically connected through a branch electrode of the second domain to the second stem electrode and is formed of a material of the branch electrode of the second domain.

15. The display device of claim 14, wherein the connecting member is positioned closer to the first data line than to the second data line.

16. The display device of claim 6, comprising:
first-row sub-pixel electrodes aligned with the sub-pixel electrode in the first direction; and
first-column sub-pixel electrodes aligned with the sub-pixel electrode in the second direction.

17. The display device of claim 16, comprising:
a second scan line neighboring the first scan line with no intervening scan line being positioned between the first scan line and the second scan line;
second transistors; and
second-row sub-pixel electrodes electrically connected through the second transistors to the second scan line.

18. The display device of claim 16, comprising: a second transistor, wherein one of the first-column sub-pixel electrodes is immediately adjacent to the sub-pixel electrode with no intervening sub-pixel electrode and is electrically connected through the second transistor to the first data line.

19. The display device of claim 1, wherein the second protrusion is wider than the first protrusion in the second direction.

20. The display device of claim 1, wherein a maximum overlap between the second protrusion and the second data line is greater than a maximum overlap between the first protrusion and the first data line.

* * * * *